(12) United States Patent
Toura

(10) Patent No.: US 7,502,512 B2
(45) Date of Patent: Mar. 10, 2009

(54) IMAGE PROCESSING APPARATUS AND IMAGE PROCESSING METHOD

(75) Inventor: Kosuke Toura, Tokyo (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 657 days.

(21) Appl. No.: 10/994,814

(22) Filed: Nov. 22, 2004

(65) Prior Publication Data

US 2005/0259278 A1 Nov. 24, 2005

(30) Foreign Application Priority Data

May 21, 2004 (JP) .............................. 2004-151975
Oct. 26, 2004 (JP) .............................. 2004-311089

(51) Int. Cl.
*G06K 9/62* (2006.01)

(52) U.S. Cl. ....................... 382/209; 382/274; 356/536

(58) Field of Classification Search .................. 382/209
See application file for complete search history.

(56) References Cited

U.S. PATENT DOCUMENTS

2003/0025954 A1* 2/2003 Takano et al. ............... 358/536
2003/0228066 A1* 12/2003 Tomita et al. ............... 382/274

FOREIGN PATENT DOCUMENTS

| JP | 61170186 | 7/1986 |
|----|----------|--------|
| JP | 5-324826 | 12/1993 |
| JP | 9-284553 | 10/1997 |
| JP | 9-307750 | 11/1997 |
| JP | 2000-101845 | 4/2000 |
| JP | 2002-252764 | 9/2002 |
| JP | 2003-018409 | 1/2003 |
| JP | 2003051942 | 2/2003 |

OTHER PUBLICATIONS

Japanese Office Action dated May 13, 2008 issued in corresponding application No. 2004-311089.
Translation of Japanese Office Action dated May 13, 2008 issued in corresponding application No. 2004-311089.
Japanese Office Action and a corresponding English translation issued in the corresponding foreign application No. JP 2004-311089.

* cited by examiner

*Primary Examiner*—Samir A. Ahmed
*Assistant Examiner*—Aklilu k Woldemariam
(74) *Attorney, Agent, or Firm*—Cohen Pontani Lieberman & Pavane LLP

(57) ABSTRACT

An image processing apparatus, including: an averaging processing section to periodically carry out an averaging processing on image data of an averaging target, the averaging processing calculating an average value of pixel values of pixels which correspond to a position of a one-dimensional or two-dimensional averaging pattern designating averaging target pixels and replacing each pixel value of the pixels which correspond to the position of the averaging pattern with the average value; and a screen processing section to, by using a screen pattern, periodically carry out a screen processing on the image data on which the averaging processing has been carried out, a periodicity of the screen processing is same as that of the averaging processing.

24 Claims, 12 Drawing Sheets screen pattern of M

FIG 9

WHEN SPECIFIC REGION IS INCLUDED mt:
| 0 | 0 | 0 | 0 | 0 | 0 |
|---|---|---|---|---|---|
| 0 | 0 | 0 | 0 | 0 | 0 |
| 0 | 0 | 0 | 0 | 1 | 0 |
| 0 | 0 | 1 | 1 | 1 | 0 |
| 0 | 0 | 1 | 1 | 1 | 0 |
| 0 | 0 | 0 | 1 | 1 | 0 |

Pa f3:
| 45 | 30 | 25 | 31 | 30 | 25 |
|---|---|---|---|---|---|
| 50 | 55 | 50 | 48 | 41 | 40 |
| 60 | 52 | 65 | 55 | 48 | |
| 65 | 65 | 40 | 45 | | |
| 70 | 60 | 51 | | | |
| | | | | | |

AVERAGING → f4:
| 45 | 30 | 25 | 31 | 30 | 25 |
|---|---|---|---|---|---|
| 50 | 55 | 50 | 48 | 41 | 40 |
| 60 | 52 | 65 | 55 | 46 | |
| 65 | 65 | 46 | 46 | | |
| 70 | 60 | 46 | | | |
| | | | | | |

▨ : SPECIFIC REGION
▧ : EFFECTIVE PIXEL

FIG.10A

| | | | | | |
|---|---|---|---|---|---|
| 0 | 0 | 0 | 0 | 0 | 0 |
| 0 | 0 | 0 | 0 | 0 | 0 |
| 0 | 0 | 0 | 0 | 1 | 0 |
| 0 | 0 | 1 | 5 | 5 | 0 |
| 0 | 0 | 2 | 5 | 5 | 2 |
| 0 | 0 | 0 | 2 | 3 | 0 |

*mt*

*Pa*

▨ : averaging target pixel

FIG.10B

| 45 | 30 | 25 | 31 | 30 | 25 |
|---|---|---|---|---|---|
| 50 | 55 | 50 | 48 | 41 | 40 |
| 60 | 52 | 65 | 55 | 48 | 44 |
| 65 | 40 | 45 | 51 | 35 | |
| 70 | 60 | 51 | 50 | 50 | 44 |
| 75 | 61 | 65 | 45 | 55 | 40 |

*f5*

▨ : effective pixel

FIG.10C

| 45 | 30 | 25 | 31 | 30 | 25 |
|---|---|---|---|---|---|
| 50 | 55 | 50 | 48 | 41 | 40 |
| 60 | 52 | 65 | 55 | 48 | 44 |
| 65 | 65 | 40 | 225 | 255 | 35 |
| 70 | 60 | 51 | 250 | 250 | 88 |
| 75 | 61 | 65 | 90 | 165 | 40 |

| 45 | 30 | 25 | 31 | 30 | 25 |
|---|---|---|---|---|---|
| 50 | 55 | 50 | 48 | 41 | 40 |
| 60 | 52 | 65 | 55 | 48 | 44 |
| 65 | 65 | 48 | 48 | 48 | 35 |
| 70 | 60 | 48 | 48 | 48 | 48 |
| 75 | 61 | 65 | 48 | 48 | 40 |

*f7*

FIG.13
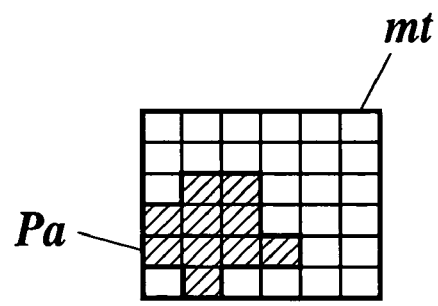
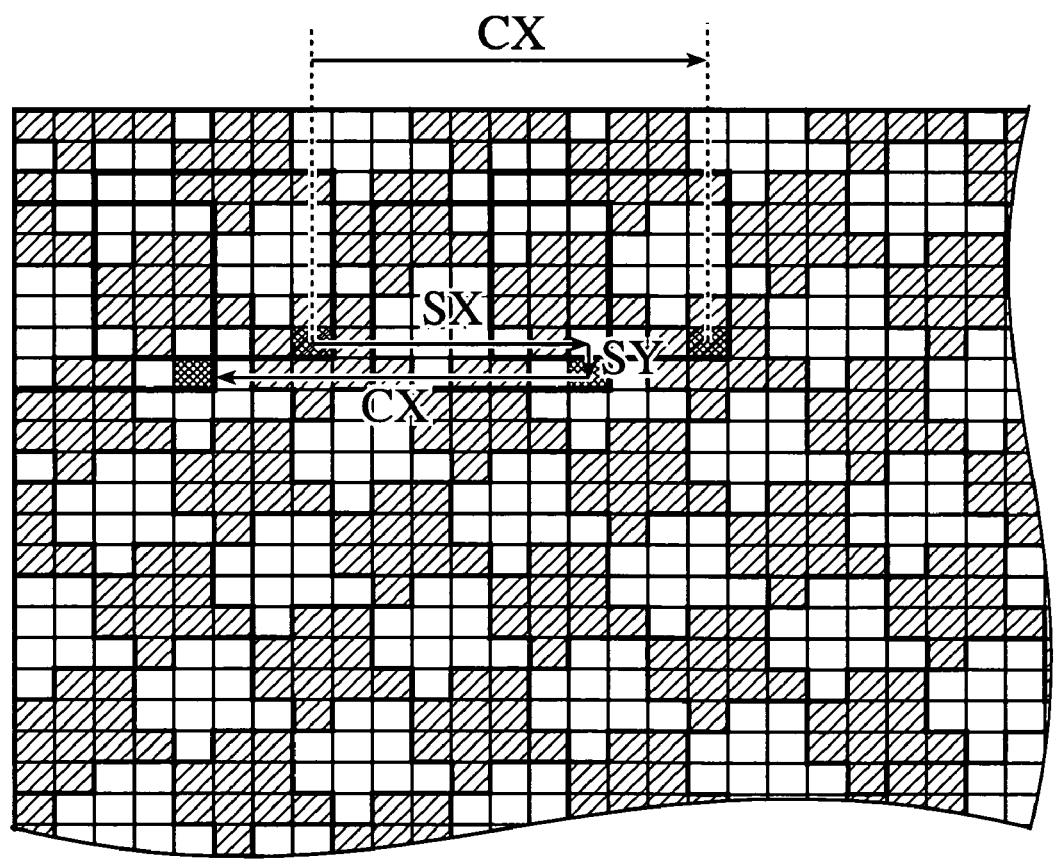
SX=7
SY=1
CX=10

IMAGE PROCESSING APPARATUS AND IMAGE PROCESSING METHOD

BACKGROUND OF THE INVENTION

1. Field of the Invention

The present invention relates to an image processing apparatus and an image processing method, for carrying out a screen processing on an image data. In particular, the present invention relates to an image processing apparatus and an image processing method, for carrying out an averaging processing as a preprocessing of the screen processing.

2. Description of Related Art

On the occasion of outputting image data of a document image, when a screen processing such as a dithering processing is carried out to represent half tone, there are times when a peculiar repetitive pattern called moiré pattern occurs on the outputted image because of the interference between the period due to the halftone dot structure of the document and the period of the pattern applied in the screen processing. Breaking the periodic structure of the document is effective in preventing the occurrence of the moiré pattern, and conventionally, an averaging processing has been carried out for the purpose of breaking such periodic structure (e.g. refer to JP-Tokukaihei-05-324826).

However, the averaging processing averages the periodic structure of the document image as well as the detailed portion of the image, there has been a problem where the sharpness is deteriorated. Therefore, in order to retain the resolution while preventing the presence of the moiré pattern, there has been proposed methods in which the periodicity is broken by dispersing the position which represents the maximum value of the dithering pattern corresponding to the degradation (e.g. refer to JP-Tokukaihei-09-284553), or an edge portion where the sharpness is necessary is detected and an averaging processing is carried out on the edge portion under a condition that is different than other portions (e.g. refer to JP-Tokukai-2000-101845).

However, the conventional averaging processing, which is synchronous to the periodic structure of the screen, was only applicable to the main scanning direction, i.e. only applicable to the one-dimensional case, and was not applicable to the dot-shaped two-dimensional screen. As a result, the moiré pattern is prone to occur for the dot-shaped screen where when a two-dimensional space filter, for example, is used to eliminate the moiré pattern, the sharpness of the output image is lost, causing the occurrence of the deterioration of the image resolution. While a method, which uses a pattern having a periodic structure which is independent to two dimensionalities, is proposed to solve this kind of problems, however, in general, besides that a large memory is needed, a complex calculation of the pixel position must be carried out, causing it difficult to be applied in practice.

SUMMARY OF THE INVENTION

Accordingly, considering the weak points of the above mentioned conventional arts, an object of the present invention is to provide a novel image processing apparatus and/or method. Another object of the present invention is to provide an image processing apparatus and/or method that is capable of suppressing the occurrence of the moiré pattern without deteriorating resolution superfluously.

Before summarizing the present invention, some terms used in this specification are presented. In this specification, "period," "periodic," "periodically," and "periodicity" are the terms which relate to regular or predictable repetition of phenomena. The regular or predictable repetition of phenomena may include a spatial repetition of the phenomena.

In order to achieve at least one of the above mentioned objects, in accordance with a first aspect of the invention, there is provided an image processing apparatus which comprises: an averaging processing section to periodically carry out an averaging processing on image data of an averaging target, the averaging processing calculating an average value of pixel values of pixels which correspond to a position of a one-dimensional or two-dimensional averaging pattern designating averaging target pixels, and replacing each of the pixel values of the pixels which correspond to the position of the averaging pattern with the average value; and a screen processing section to, by using a predetermined screen pattern, periodically carry out a screen processing on the image data on which the averaging processing has been carried out, a screen processing having a period which is the same as the averaging processing, by using a predetermined screen pattern.

Preferably, when an image discriminating signal showing a property of each pixel of the image data is inputted, the averaging processing section excludes pixels belonging to a specific region from a target of the averaging processing, based on the image discriminating signal.

Preferably, shapes of the averaging pattern and the screen pattern are modifiable.

Preferably, shapes of the averaging pattern and the screen pattern vary with each color material used for an output of an image data. Preferably, periods of the averaging pattern and the screen pattern are modifiable.

Preferably, periods of the averaging processing and the screen processing vary with each color material used for an output of the image data.

Preferably, the averaging pattern is a pattern in which a same weighting coefficient is set for all averaging target pixels.

Preferably, the averaging processing section calculates an average value which averages uniformly pixel values of pixels which correspond to a position of the averaging pattern, based on a weighting coefficient which has been set in the averaging pattern, and replaces the pixel values of the pixels which correspond to the position of the averaging pattern with the calculated average value.

Preferably, the averaging pattern is a pattern where different weighting coefficients have been set for different averaging target pixels.

Preferably, the averaging processing section calculates respectively a multiplication value which is obtained by multiplying each pixel value of each pixel which corresponds to a position of the averaging pattern by a corresponding one of the weighting coefficients, and replaces each pixel value with an average value which is obtained by dividing a sum of each multiplication value by a sum of all weighting coefficients.

Preferably, the screen processing section carries out the screen processing at a random period; and the averaging processing section carries out the averaging processing at the random period of the screen processing.

Preferably, the averaging processing section carries out the averaging processing at a fixed period; and the screen processing section carries out the screen processing at the fixed period of the averaging processing.

Preferably, the screen pattern has the same shape as the averaging pattern.

In accordance with a second aspect of the invention, there is provided an image processing method which comprises: an averaging processing step to periodically carry out an average processing on image data of an averaging target, the averaging processing calculating an average value of pixel values of pixels which correspond to a position of a one-dimensional or two-dimensional averaging pattern designating averaging target pixels and replacing each of the pixel values of the pixels which correspond to the position of the averaging pattern with the average value; and a screen processing step to, by using a predetermined screen pattern, periodically carry out a screen processing on the image data on which the averaging processing has been carried out, a periodicity of the screen processing is same as that of the averaging processing.

Preferably, when an image discriminating signal showing a property of each pixel of the image data is inputted, the averaging processing step excludes pixels belonging to a specific region from a target of the averaging processing, based on the image discriminating signal.

Preferably, shapes of the averaging pattern and the screen pattern are modifiable.

Preferably, shapes of the averaging pattern and the screen pattern vary with each color material used for an output of an image data.

Preferably, periods of the averaging pattern and the screen pattern are modifiable.

Preferably, periods of the averaging processing and the screen processing vary with each color material used for an output of the image data.

Preferably, the averaging pattern is a pattern in which a same weighting coefficient is set for all averaging target pixels.

Preferably, the averaging processing section calculates an average value which averages uniformly pixel values of pixels which correspond to a position of the averaging pattern, based on a weighting coefficient which has been set in the averaging pattern, and replaces the pixel values of the pixels which correspond to the position of the averaging pattern with the calculated average value.

Preferably, the averaging pattern is a pattern where different weighting coefficients have been set for different averaging target pixels.

Preferably, the averaging processing section calculates respectively a multiplication value which is obtained by multiplying each pixel value of each pixel which corresponds to a position of the averaging pattern by a corresponding one of the weighting coefficients, and replaces respectively each pixel value with an average value which is obtained by dividing a sum of each multiplication value by a sum of all weighting coefficients.

Preferably, the screen processing section carries out the screen processing at a random period; and the averaging processing section carries out the averaging processing at the random period of the screen processing.

Preferably, the averaging processing section carries out the averaging processing at a fixed period; and the screen processing section carries out the screen processing at the fixed period of the averaging processing.

Preferably, the screen pattern has the same shape as the averaging pattern.

BRIEF DESCRIPTION OF THE DRAWINGS

The present invention will become more fully understood from the detailed description given hereinbelow and the accompanying drawings which are given by way of illustrating only, and thus are not intended as a definition of the limits of the invention, and wherein;

FIG. 8 illustrates an averaging which uses a two-valued averaging pattern;

FIG. 9 illustrates an averaging in which case a specific region is included in the image region of the averaging target;

FIG. 10A, 10B and 10C illustrate an averaging which uses a multi-valued averaging pattern;

FIG. 13 illustrates a specific example of the scanning processing.

DETAILED DESCRIPTION OF THE PREFERRED EMBODIMENTS

An example is explained in the present embodiment, wherein a matching table in which an averaging pattern having the same pattern shape as the screen pattern is scanned along the main scanning direction and the secondary scanning direction of the image data, and in each scanning line, a screen processing is carried out at the same period as the averaging processing which averages the pixel value of each pixel so as to be consistent with the position of the averaging pattern of the matching table.

Figure 1:
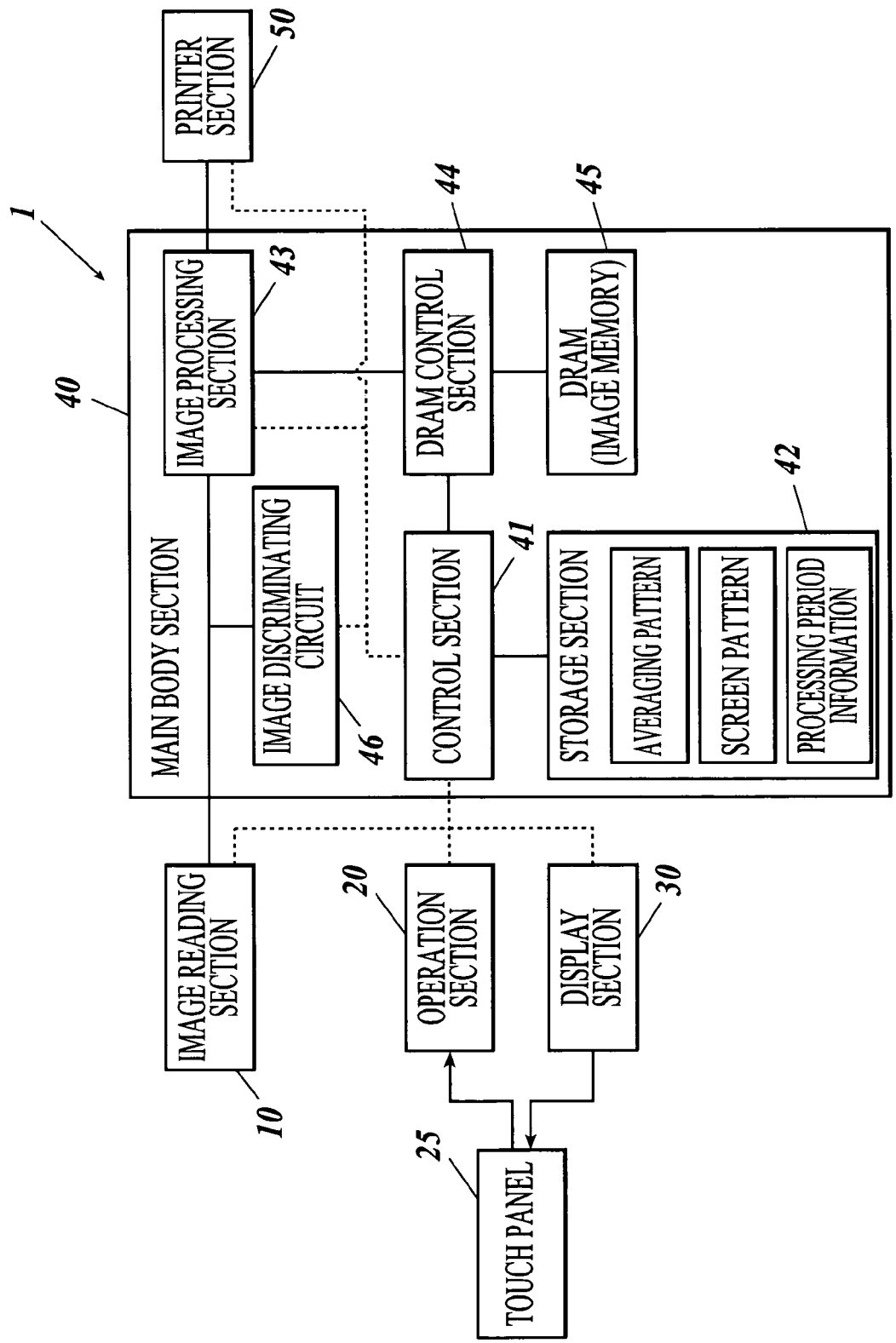
FIG. 1 illustrates an internal configuration of the image processing apparatus in the present embodiment.

FIG. 1 illustrates the internal configuration of an image processing apparatus 1 in accordance with the embodiment. As shown in FIG. 1, the image processing apparatus 1 comprises an image reading section 10, an operation section 20, a touch panel 25, a display section 30, a main body section 40 and a printer section 50. The main body section 40 comprises a control section 41, a storage section 42, an image processing section 43, a DRAM (Dynamic Random Access Memory) control section 44, a DRAM 45, and an image discriminating circuit 46. In the figure, the solid lines linking each section indicate system buses, and the dotted lines indicate serial buses.

The image reading section 10 comprises a light source, a CCD (Charge Coupled Device) line image sensor, an A/D converter or the like. A document image is-read out by focusing the reflected light of the light which lighting-scans from the light source to the document on the CCD line image sensor and by photo-electrically converting thus focused and scanned light by the CCD line image sensor, the read-out image signal is converted to digital image data by the A/D converter. Herein, the term of image is not limited to figures, pictures or the like, rather, character images such as characters, symbols, or the like are also included.

The operation section 20 comprises various kinds of function keys such as a start key for instructing to start printing, a numeric key or the like. When these function keys, the touch panel 25, or the like, are operated, the corresponding operation signals are outputted to the control section 41.

The display section 30 comprises an LCD (Liquid Crystal Display) which is integrally provided with the touch panel 25, and displays various kinds of operation screens on the LCD for operating printing.

Next, each part of the main body section 49 is explained. The control section 41 controls the operation of each part of the image processing apparatus 1 centrally according to system programs stored in the storage section 42 and various control programs such as printing processing programs.

The storage section 42 stores system programs and various kinds of control programs such as print processing programs. Also, the storage section 42 stores an averaging pattern which is used during averaging processing in the image processing section 43; a screen pattern which is used during screen processing; and processing period information corresponding to each of the colors of Y (yellow), M (Magenta), C (Cyan) and K (black) which are output possible in the image processing apparatus 1. The processing period information is information about the shift amount which is referred when scanning the screen pattern used during screen processing.

Figure 2:
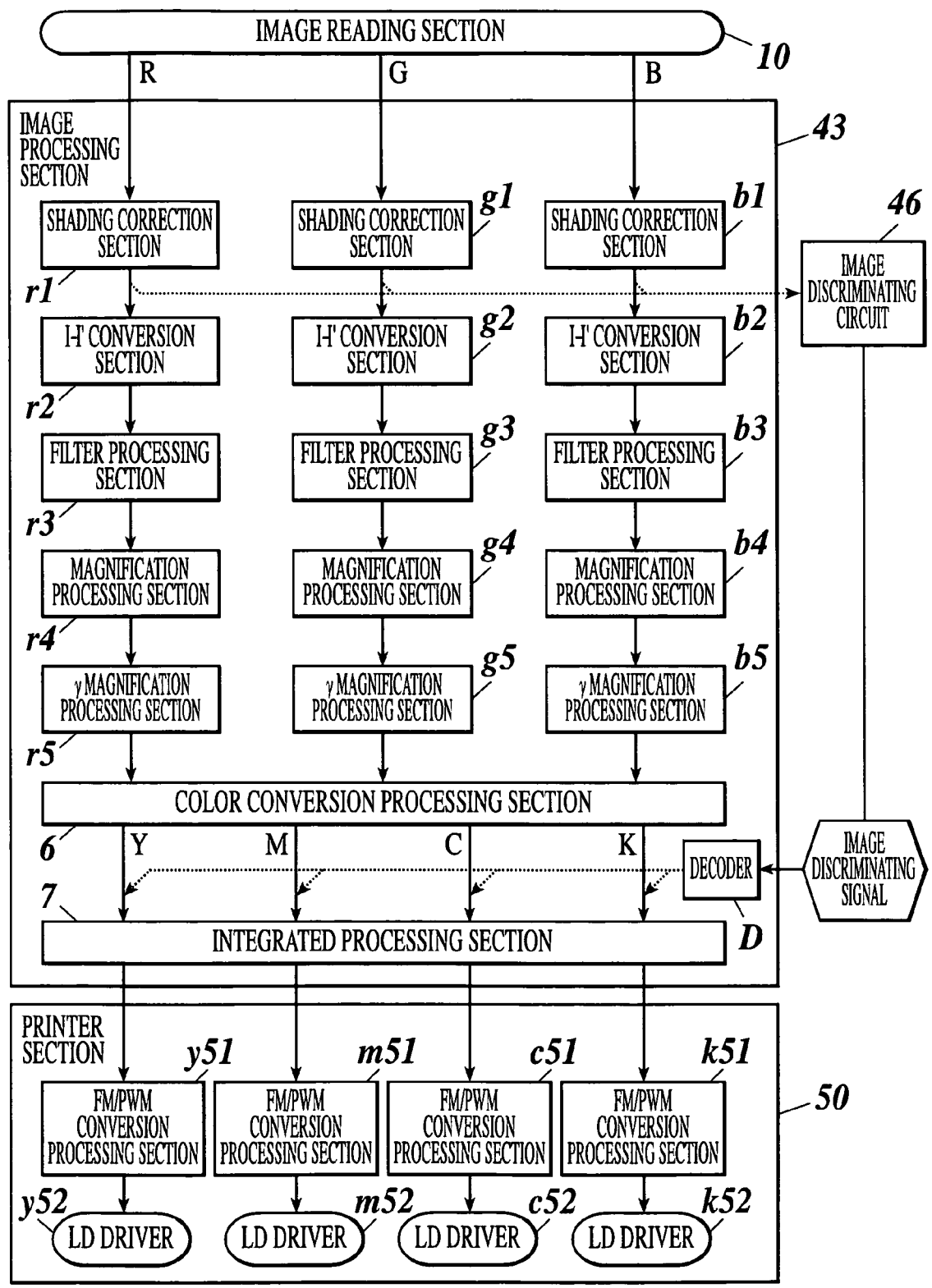
FIG. 2 illustrates an internal configuration of the image processing section.

As shown in FIG. 2, the image processing section 43 comprises shading correction sections of r1, g1 and b1; I-I' conversion processing sections of r2, g2 and b2; filter processing sections of r3, g3 and b3; magnification conversion sections of r4, g4 and b4; γ conversion sections of r5, g5 and b5; a color conversion processing section 6, an integrated processing section 7; and a decoder D. Image processing is carried out by the image processing section 43 on the image data corresponding to each inputted color which is separated into each of the colors of R (Red), G (Green) and B (Blue), and the processed image data is outputted to the printer section 50.

The shading correction sections of r1, g1 and b1 correct the brightness unevenness generated by the image reading section 10. The shading correction sections of r1, g1 and b1 are provided in advance with an LUT (Look Up Table) corresponding to each of the colors of R (Red), G (Green) and B (Blue) for correcting the brightness unevenness, and the shading correction is carried out by carrying out a brightness conversion on the image data inputted from the LUT. Each image data which has been shading-corrected is outputted respectively to the I-I' conversion processing sections of r2, g2 and b2.

The I-I' conversion processing sections of r2, g2 and b2 are provided with an LUT corresponding to each of the colors of R, G and B for converting a luminance character, which is peculiar to the CCD line image sensor of the image reading section 10, into an optimal luminance character corresponding to the visual character of human being. Each luminance-converted data is outputted to the filter processing sections of r3, g3 and b3.

The filter processing sections of r3, g3 and b3 carry out sharpness processing on the inputted image data using an MTF (Modulation Transfer Function) filter. Each sharpness-processed image data is outputted respectively to the magnification processing sections of r5, g5 and b5.

The γ conversion sections of r5, g5 and b5 convert the inputted image data by using the LUT in which a linear output value of density is given corresponding to a linear input value of luminance, allowing the linear character of the luminance to be converted to the linear character of the density (This is referred as γ conversion). Each image data on which a γ conversion is carried out is outputted to the color conversion processing section 6.

After carrying out color correction on each inputted image data of R, G and B, the color conversion processing section 6 converts to each image data corresponding to color materials of Y, M, C and K, which are output possible in the image processing apparatus 1. Each of the image data Y, M, C and k, which are generated by the color conversion, is outputted to-the integrated processing section 7 after being temporarily stored in the DRAM 45.

Figure 3:
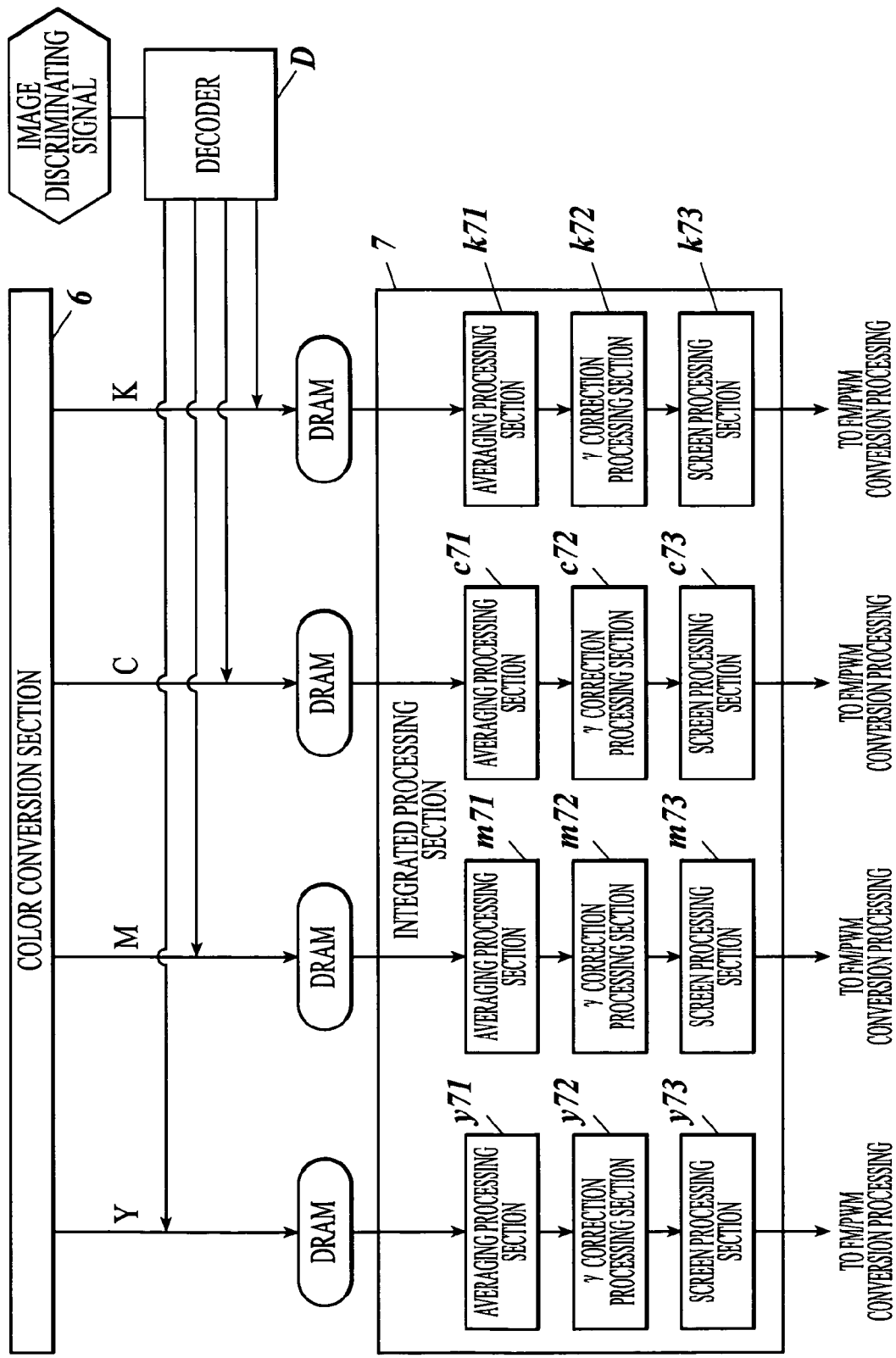
FIG. 3 illustrates an internal configuration of the integrated processing section.

As shown in FIG. 3, the integrated processing section 7 comprises averaging processing sections of y71, m71, c71 and k71; γ conversion sections of y72, m72, c72 and k72; and screen processing sections of y73, m73, c73 and k73.

The averaging processing sections of y71, m71, c71 and k71 carry out averaging processing on the image data which is inputted using an averaging pattern which has been set in an n pixel×n pixel matching table. During averaging processing, because the image discriminating signal (a signal showing properties of an image such as character region, edge region, region of lines and pictures, or the like), which has been generated in the image discriminating circuit 46, is decoded in the decoder D and then inputted, the specific region which is requested by the sharpness of characters, thin lines or the like are determined based on the inputted image discriminating signal, and the specific region is excluded from the targets of averaging processing. In addition, the image discriminating signal can be generated in an external apparatus and then inputted, or can be inputted together with the image data of the output target, i.e. the generation and the input path of the image discriminating signal are not particularly defined.

Figure 4:
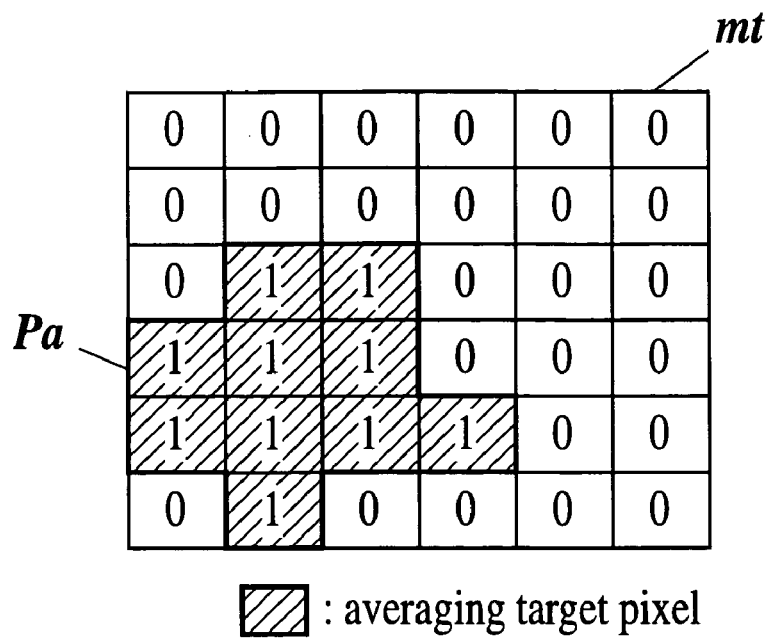
FIG. 4 illustrates one example of an averaging pattern and a matching table.

Hereinafter, with an example of concrete averaging patterns being shown, the averaging processing carried out by each of the averaging processing sections y71, m71, c71 and k71 is explained. The averaging patterns are generated corresponding to each of the color materials Y, M, C and K, and stored in the storage section 42 together with the processing period information. The processing period information refers to, when carrying out averaging processing using the averaging patterns, various kinds of parameter information such as the scanning period of the main scanning direction or the secondary scanning direction, the number of shifted pixels, a starting position which starts the averaging processing. FIG. 4 illustrates an example of an averaging pattern of a color material and a matching table of the pattern. As shown in FIG. 4, the matching table mt is a matrix table with a size of 6-pixel×6-pixel, in which for each pixel, the average target pixel (a pixel indicated by "1" in the figure) and non-average target pixel (a pixel indicated by "0" in the figure) are specified. The region which comprises the average target pixels is an averaging pattern Pa. The number which is set in each average target pixel of the averaging pattern Pa illustrates the value of the weighted coefficient, in the averaging pattern Pa the same weighted coefficient "1" is set for all the average target pixels. The averaging pattern can be set corresponding to each color material.

Figure 5:
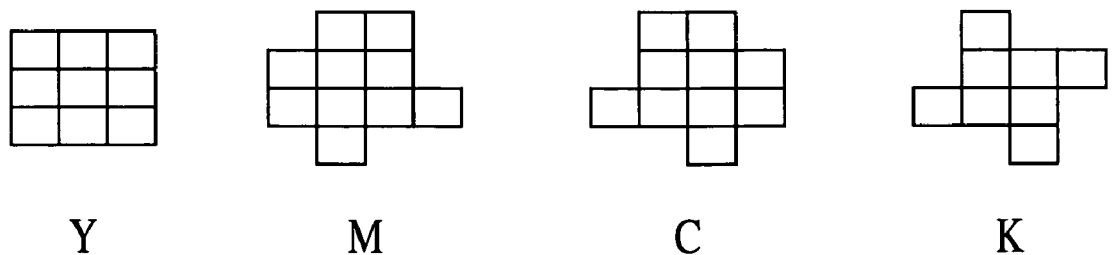
FIG. 5 illustrates different exemplary averaging patterns for different color materials.
Figure 6A:
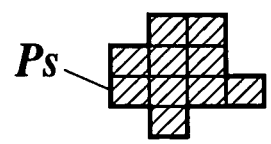
FIG. 6A illustrates a screen pattern.
Figure 6B:
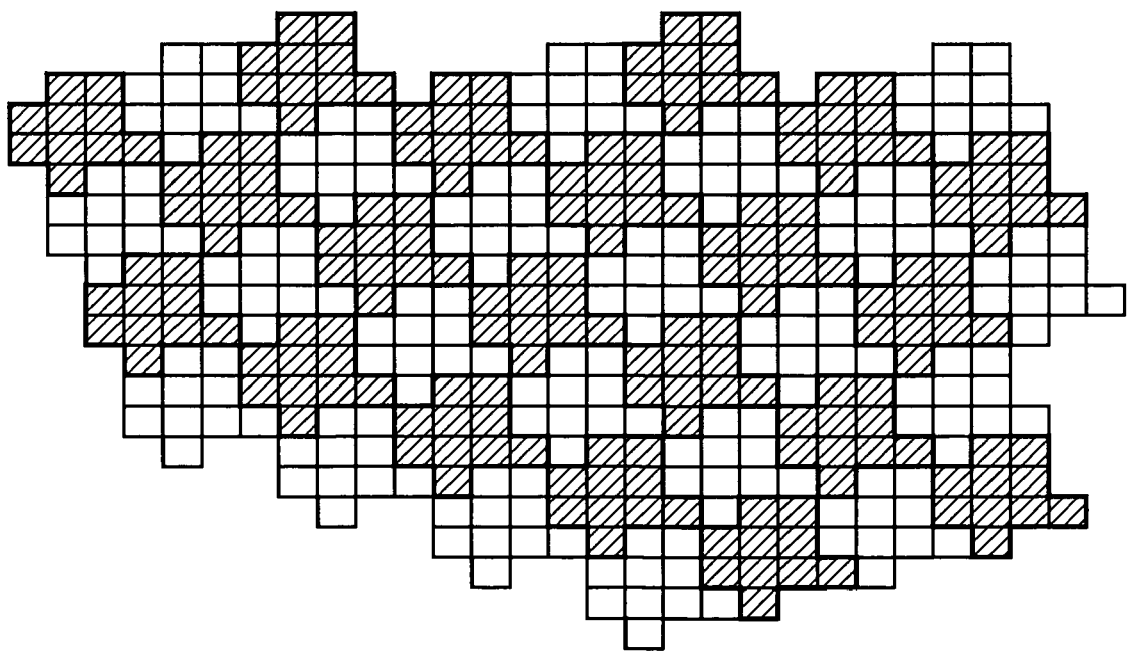
FIG. 6B illustrates an exemplary application of the screen pattern shown in FIG. 6A.

FIG. 5 illustrates averaging patterns for each of the color materials Y, M, C and K. The shapes of the averaging patterns are the same as the shapes of the screen patterns in the screen processing which is carried out after the averaging processing. As an example, the screen pattern Ps shown in FIG. 6A is applied to the screen processing in the screen processing section m73. The screen pattern Ps has the same pattern shape as the averaging pattern Pa (refer to FIG. 5) of the color material M. FIG. 6B illustrates an example in which the screen pattern Ps is applied to an image data, and the screen processing is carried out. As shown in FIG. 6B, it turns out that dot-shaped screen pattern Ps has a periodicity along the slanting line-shaped direction. In addition, while in the figure there are screen patterns with and without slant lines attached, they are used to distinguish the adjoining screen patterns easily, and there is not necessarily any difference from the viewpoint of processing.

Figure 7:
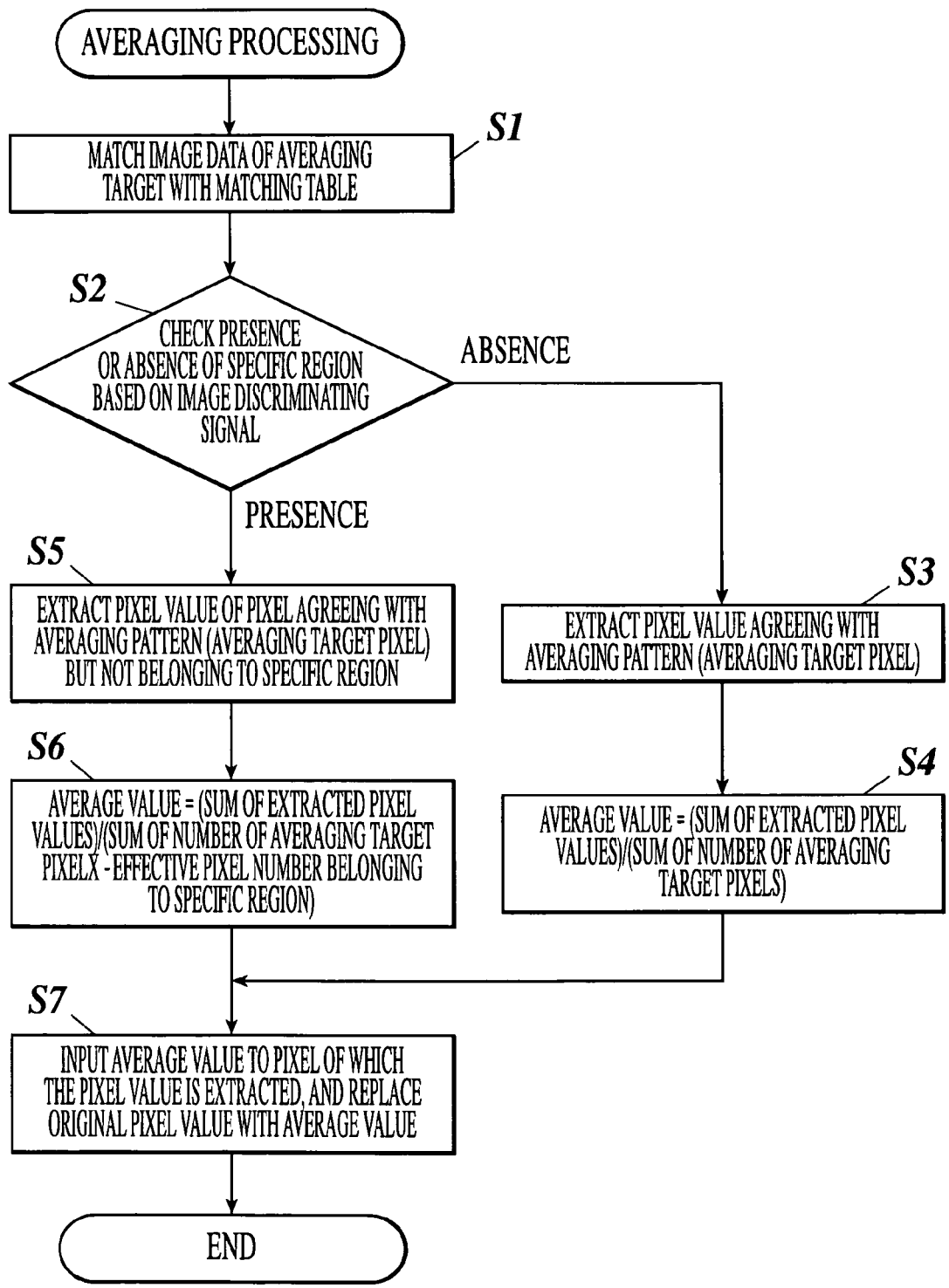
FIG. 7 is a flow chart explaining an averaging processing executed in the averaging processing section.

Next, with reference to FIG. 7, explained is an averaging processing which is carried out by using the afore-mentioned averaging pattern Pa. In the averaging processing shown in FIG. 7, first the matching table mt and the image data of the averaging target are matched (step S1). Subsequently, based on the image discriminating signal inputted from the decoder D, whether a specific region, which is requested by the sharpness property of characters, thin lines or the like, is included in the image region of the matched image data, that is, the presence or absence of the specific region is determined (step 2). When determining that the specific region is absent (step 2; NO), go to step S3; when determining that the specific region is present (step 2 YES), go to step S5.

First explained is the processing after step 3 when determining that the specific region is absent. Here, the case where the averaging carried out on the image region f1 shown in FIG. 8 is explained as an example.

In step S3, the pixel value of each pixel (pixels shown by slant lines in the image region f1) corresponding to the averaging pattern Pa is extracted. Hereinafter a pixel, the pixel value of which is extracted and on which the averaging is carried out, is referred as an effective pixel. Next, from the extracted pixel values the corresponding average value is calculated. The average value is obtained by dividing the sum of all the extracted pixel values by the number of the effective pixels (step S4). In practice, the pixel value of each effective pixel is multiplied by the weighting coefficient which is set in the averaging target pixel, and the average value is obtained by dividing the sum of each multiplied value by the sum of the weighting coefficients. However, the averaging pattern Pa is a two-valued pattern, and the same weighting coefficient "1" is set in the averaging target pixel, therefore, even if each effective pixel is multiplied by the weighting coefficient "1", the pixel value of each effective pixel is the same as the pixel value before the multiplication is carried out. Hence, even if dividing the sum of each pixel value by the number of the effective pixels, the same average value is obtained as the case where the above weighting coefficient is used, therefore, in the present embodiment it is assumed that the sum of each pixel value is divided by the number of the effective pixels.

In the example shown in FIG. 8, the sum of each pixel value of the effective pixels in the image region f1 is "479", the number of the effective pixels is "10", hence the average value is "47" (the decimal part of 47.9 is omitted). Next, the calculated average value is inputted to the effective pixel, and the original value is replaced by the average value (step S7). In this way, when an image region f2, where only the pixels which are consistent with the averaging pattern Pa are averaged uniformly, is obtained, the present processing is ended.

Next, explained is the processing from step 5 when determining that the specific region is present. Here, the case, where the averaging processing is carried out on the image region f3 as shown in FIG. 9, is explained as an example.

In step S5, the pixel value of each pixel (the pixels illustrated by slant lines in the image region f3) which corresponds to the averaging pattern Pa and which does not belong to the specific region is extracted. In the example shown in FIG. 9, each pixel value of the 4 effective pixels "51", "40", "45", "48" that do not belong to the specific region in the image region f3 is extracted. Next, the average value is calculated from the extracted pixel values. The average value is obtained by dividing the sum of each extracted pixel value by the number (i.e. the value which is obtained by subtracting from the number of the averaging target pixels the number of the averaging target pixels that belong to the specific region) of the effective pixels (step S6). In the example shown in FIG. 9, the sum of each pixel value of the effective pixels in the image region f3 is "184", and the number of the effective pixels is "4", hence the average value is "46". Next, the calculated average value is inputted to the effective pixel, and the original value is replaced by the average value (step S7). In this way, when an image region f4, where except the specific region the pixels which are consistent with the averaging pattern Pa are averaged uniformly, is obtained, the present processing is ended.

In the above explained is an example of averaging processing which uses the averaging pattern Pa that averages the pixel values of the effective pixels uniformly. However, averaging processing can also be done in such a way that use an averaging pattern Pb as shown in FIG. 10A and weight the pixel values of the effective pixels. A pattern, like the averaging pattern Pa, where the same weighting coefficient is set to all the averaging target pixels, is referred as a binary pattern; a pattern, like the averaging pattern Pb, where different weighting coefficients are set to each averaging target pixel, is referred as a multi-valued pattern. In this way, the resolution can be improved by weighting and averaging.

As shown in FIG. 10A, averaging target pixels (pixels shown in the figure by a number other than "0". The number set in each pixel illustrates the weighting coefficient set in each pixel) and non-averaging target pixels (pixels shown in the figure by a "0") are specified in the averaging pattern Pb.

With reference to FIG. 10B, explained is about the averaging processing which uses the averaging pattern Pb. For example, in the case where the averaging processing is carried out on the image region f5 having a size of 6-pixel×6-pixel, the pixel value of each pixel (pixels shown by slant lines in the image region f5) corresponding to the averaging pattern Pb in the image region f5 is extracted. Next, to each pixel value which is extracted from the effective pixels, the corresponding weighting coefficient which is set in the averaging target pixel is multiplied, and thus an image region f6 is obtained. The average value is calculated by dividing the sum of each multiplied value by the sum of each weighting coefficient. In the example shown in FIG. 10B, the sum of each pixel value is "1462", the sum of each weighting coefficient is "30", hence the average value is "48" (the decimal part of 48.733 is omitted). The calculated average value is inputted to each corresponding effective pixel, and the original pixel value is replaced with the multiplication value, allowing an image region f7, on which averaging processing is carried out by weighting the pixels which are consistent with the averaging pattern Pb, to be obtained.

Figure 11:
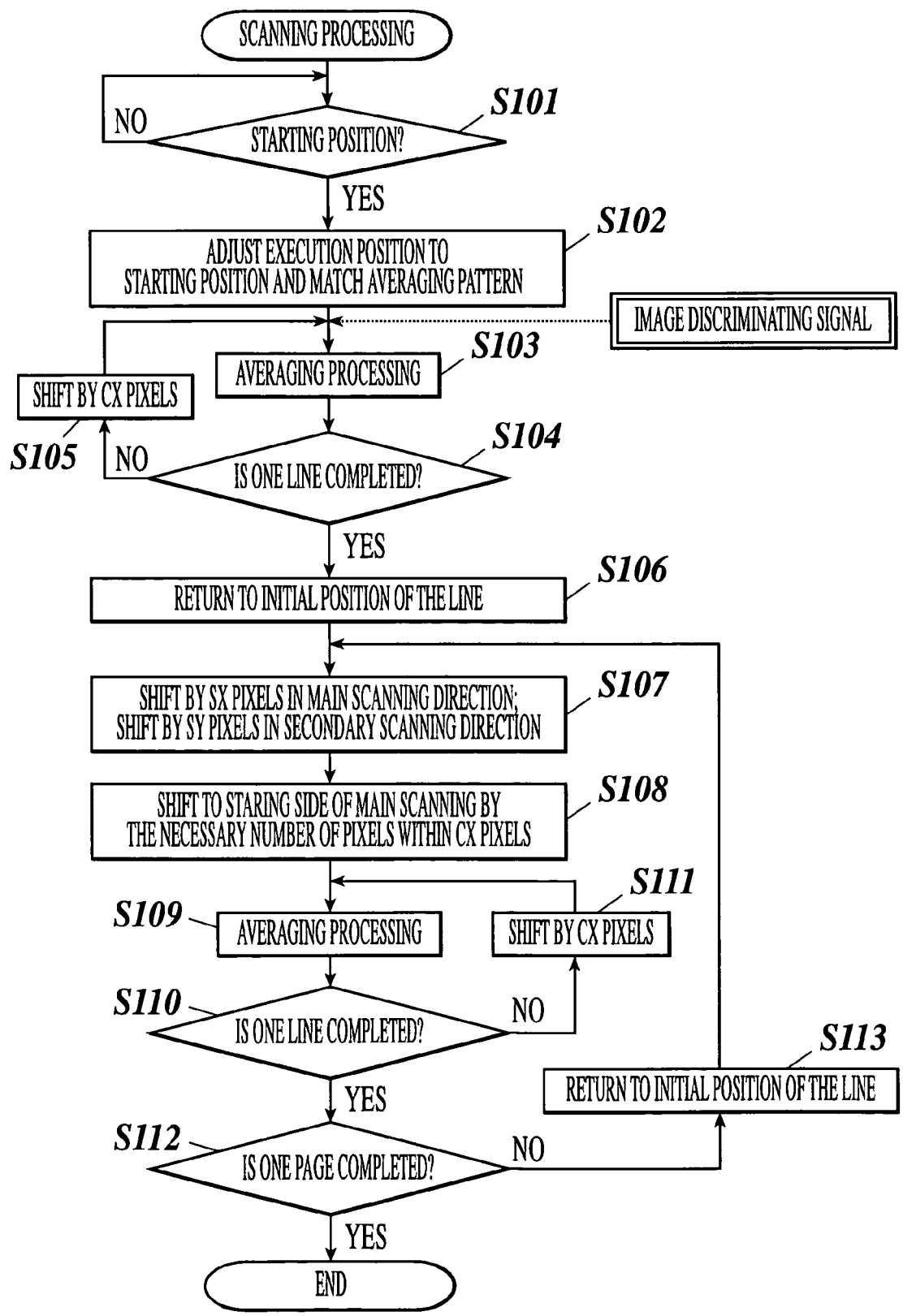
FIG. 11 illustrates a flow chart which explains the scanning processing executed by the averaging processing section.
Figure 12:
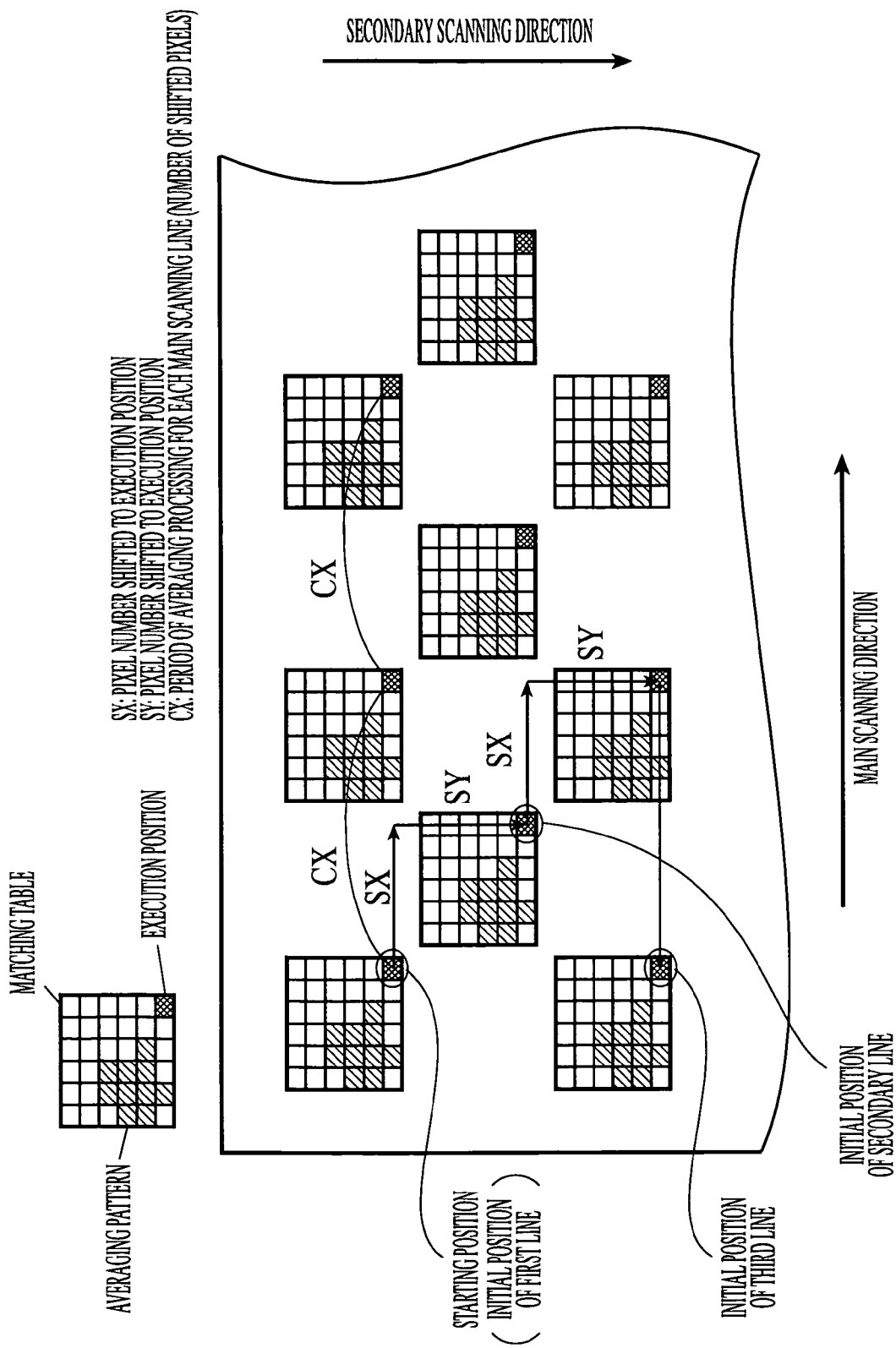
FIG. 12 is a conceptual figure illustrating the matching table which scans the image data.

The averaging processing sections y71, m71, c71 and k71 carry out the above averaging processing on the entire image data while scanning the matching table, in which the averaging patterns Pa and Pb are set, along the main scanning direction and the secondary scanning direction. Referring to FIG. 11 and FIG. 12, explained is about a scanning processing which carries out the averaging while scanning the entire image data. FIG. 11 is flow chart explaining the scanning processing and FIG. 12 is a conceptual paradigm illustrating that the matching table mt is scanned on the image data. In the following description, while explained is the case where the image data of the color material M is inputted and the averaging pattern Pa is used in the averaging processing section m71, the same processing can also be carried out in other averaging processing sections y71, c71 and k71. In addition, the same processing can be carried out for the case where the averaging pattern Pb is used.

The image data of the averaging target is accumulated one pixel by one pixel in the line buffer of the averaging processing sections y71, m71 and k71. The pixel position (hereinafter referred to as starting position) from where the averaging processing is started in a one-page image data is specified in advance, and when the image data of a specified pixel is inputted to the starting position, scanning of the matching pattern mt is started. In the same way, the pixel position (hereinafter referred to as execution position) from where the averaging processing is executed in the averaging pattern Pa is specified, and when the image data of the specified pixel is inputted to the execution position, the averaging processing is executed. In the present embodiment, the pixel which is situated at the low-right position of the table which comprises 6-pixel×6-pixel of the averaging pattern Pa.

In the scanning processing shown in FIG. 11, the averaging pattern Pa used in the averaging processing, together with its processing period information is read out from the storage section 42 corresponding to the color material of the image data of the processing target. When the input of the image data of the averaging target for one page from the DRAM 45 is started, whether the image data of the pixel of the starting position is inputted is checked (step S101), when the image data of the pixel of the starting position is inputted (step S101; YES), as shown in FIG. 12, the averaging pattern Pa is matched with the image data so that the staring position is consistent with the execution position of the matching table mt (step S102). Next, the averaging processing (refer to FIG. 7) is carried out on the image region of the matched image data (step S103).

When the averaging processing for one period is completed, whether the scanning for one line in the scanning direction is completed is checked (step S104), when the scanning for one line is not completed (step S104; NO), as shown in FIG. 12, the execution position of the averaging pattern Pa is shifted in the main scanning direction by Cx pixels (step S105), and return back to step S103, the averaging processing is carried out at the shift destination. That is, the averaging processing is repeated at a fixed period of every Cx pixels until the main scanning for one line is completed. By making the number of the shifted pixels Cx be the same as the number of the pixels of the interval (period) at which the screen processing is carried out, the averaging processing and the screen processing can be synchronized, further making it possible to prevent the presence of the moiré which is due to the difference of the period between the averaging processing and the screen processing.

When the main scanning for one line is completed (step S104; YES), the execution position is returned to the execution position (this is referred as initial position) where the averaging processing was first carried out in the line (step S106), and shifted from the initial position by Sx pixels in the main scanning direction and by Sy pixels in the secondary direction (step S107). At this time, when shifted always by Sx pixels and Sy pixels from the initial position, causing the execution position to be biased to the end side of the main scanning direction (right side in FIG. 12), therefore, the execution position is shifted so as to return back to the beginning side (left side in FIG. 12) of the possible main scanning which is within a movement by Cx pixels from the shift position (step S108). That is, in the case where the execution position can be returned back to the beginning side within a movement by Cx pixels, the execution position is shifted to the beginning side only by the difference between Sx and Sy. Then at the shift position, the averaging pattern Pa and the image data are matched, the averaging processing is carried out (step S109), and the scanning for the next scanning line is started.

Next, whether the main scanning for one line is completed is checked (step S110), when the main scanning for one line is not completed (step S110; NO), as shown in FIG. 12, the execution position of the averaging pattern Pa is shifted by Cx pixels in the main scanning direction (step S111), and go back to step S109 to carry out the averaging processing at the shift destination. That is, the averaging processing is repeated at a fixed period of Cx pixels until the main scanning for one line is completed.

And when the main scanning for one line is completed (step S110; YES), whether the main scanning and the secondary scanning on the image data for one page is completed is checked (step S112). When the main scanning and the secondary scanning for one page is not completed (step S112; NO), the execution position of the matching table mt is returned to the initial position of the line (step S113). Then go back to the processing of step S107, shift in the secondary direction and the main scanning for the next line is repeated. That is, the main scanning and the secondary scanning are repeated until the averaging processing on the image data for one page is completed. When the main scanning and the secondary scanning for one page is completed and the averaging processing on the entire image data is completed (step S112; YES), the current processing is completed, the current processing is finished. When the image data for the next page is inputted, scanning processing is again carried out from step S101.

FIG. 13 illustrates a specific example of the afore-mentioned scanning processing. FIG. 13 illustrates the example where under the scanning condition that Sx=7, Sy=1 and Cx=10, the matrix table mt shown in FIG. 4 is scanned on the image data, and the averaging processing using the averaging pattern Pa is carried out. As shown in FIG. 13, the averaging pattern has a pattern that is the same as the screen pattern and the averaging processing has a period that is the same as that of the screen processing, therefore the averaged unit region is synchronous with the screen pattern. In this way, by adjusting the shape of the averaging pattern and adjusting the scanning condition of Sx, Sy and Cx according to the screen pattern, the averaging processing can be carried out while being synchronous with the screen processing.

In this way, each image data on which the averaging processing has been carried out is inputted to the γ conversion sections y72, m72, c72 and k72.

The γ conversion processing sections y72, m72, c72 and k72 carry out gradation conversion on the image data inputted by using the LUT which is prepared in advance for the use of γ correction, and apply γ correction processing. The image data of each color material on which γ correction processing has been carried out is inputted to the screen processing sections y73, m73, c73 and k73, respectively.

The screen processing sections y73, m73, c73 and k73 carry out screen processing on the inputted image data by using techniques such as ordered dither method or the like. At the time of screen processing, the screen pattern, where multiple thresholds are set to be matrix-shaped in advance, is read out from the storage section 42, the screen pattern and the image data are matched, the screen pattern is compared with the threshold of the screen pattern corresponding to each pixel position, and the output value of each pixel is multi-valued (i.e. multi-level representation). In addition, conventional techniques that have been publicly known can be used as the multi-valued method.

The DRAM control section 44 controls the input and the output of the image data stored in the DRAM 45. The DRAM 45 is the memory which stores the image data.

The image discriminating circuit 46 carries out data analysis on the image data which is read out and which is inputted in the image reading section 10, determines the character region as the specific region, and generates the image discriminating signal; or carries out the edge detection on the image data, determines the detected edge region as the specific region, generates the image discriminating signal, generates image discriminating signal on the image data of the output target, and outputs to the image processing section 43.

The printer section 50 carries out the color printing output of Y, M, C and K using electrophotography system. The printer section 50 includes an exposure section, which comprises an LD (Laser Device) driver and a laser light source, for forming a latent image on a photoconductor drum; a development section for forming an image by blowing toner to the photoconductor drum; a transfer belt for transferring the toner, which is on the photoconductor drum where the image has been formed, to a printing sheet. In addition, other printing systems can be applied to the printing system.

When the image data of each color material is inputted from the image processing section 43, the printer section 50 carries out the processing of FM (Frequency Modulation)/PWM (Pulse Width Modulation) by using the FM/PWM conversion processing sections y51, m51, c51 and k51, and inputs the modulation signal to the LD driver. The LD driver activates the laser light source based on the inputted modulation signal, and controls the light exposure amount irradiated from the laser light source.

As explained above, according to the present embodiment, the matching table is scanned in the main scanning direction and the secondary scanning direction, the pixel value of each pixel of the image region which is consistent with the averaging pattern which has been set in the matching table is averaged, and the averaging processing in which the pixel value is replaced with the average value is carried out cyclically, making it possible to carry out one-dimensional or two-dimensional averaging processing with a simple configuration. Furthermore, the averaging pattern has the same shape as the screen pattern and the averaging processing is carried out at a period that is the same as that of the screen processing, making it possible to carry out averaging processing on each region which is consistent with the screen pattern, and at the same time, to average only required region, which further makes it possible to eliminate the periodicity inconsistence between the averaging processing and the screen processing. Therefore, it is possible to suppress the occurrence of the moiré, which is apt to be present due to the inconsistence of the periodicity, without reducing the resolution superfluously.

Also, the image data as well as the inputted image discriminating signal is decoded by the decoder D, the specific region where the sharpness should be kept based on the decoded image discriminating signal is determined, and the specific region is excluded from the target of the averaging processing, making it possible to keep the sharpness of a specific region such as a character region, thin lines, edge or the like.

Also, the shape of the averaging pattern and the screen pattern, the period of the averaging processing and the screen processing can be set appropriately, making it possible to change the averaging pattern corresponding to the output color material, and to change the period so as to choose an optimal condition corresponding to the property of the color material. Furthermore, the line number of the screen and the pattern shape can be made easily to correspond to various kinds of different screen patterns by only manipulating the pattern shape of the averaging pattern and the scanning condition.

Although the invention has been explained according to the embodiments, it should also be understood that the invention is not limited to the embodiments and that various changes and modifications may be made to the invention from the gist thereof.

For example, the present invention is applicable to such a printing system in which the image reading section 30 shown in FIG. 1 is not provided, but a communication section is provided for carrying out data communication with an external computer, and image processing is carried out on the image data of the output target transmitted from the computer.

The above explanation is made that the averaging processing and the screen processing are carried out for each of the same pixel at a fixed period of every Cx pixels. However, a random period is also applicable. Here the random period means that the number of the shifted pixels Cx is not a fixed value n, but different values like p, q, and r are repeatedly adopted as the period. In this case, a value randomly generated in the control section 41 is adopted as the number of the shifted pixels Cx, and the averaging processing and the screen processing are carried out. In addition, while the period is a random value, the periods of both averaging processing and screen processing are the same, and the randomness of the period of each processing is assumed to be the same. While the moiré is present more or less in the case where the period is fixed, by adopting a random period, it is possible to reduce the presence of the moiré much more effectively.

Furthermore, in the above explanation the shape of the averaging processing is the same as that of the screen processing, however, their shapes can be different to each other, for example, the shape of the averaging processing can be set to have a larger size than that of the screen processing.

In addition, the detailed configuration and detailed operation of the image processing apparatus 1 in the present embodiment can be modified appropriately without departing from the gist of the invention.

The present application is based on Japanese Patent Application No. 2004-151975 filed with Japan Patent Office on May 21, 2004, and Japanese Patent Application No. 2004-311089 filed with Japan Patent Office on Oct. 26, 2004.

What is claimed is:

1. An image processing apparatus, comprising:
an averaging processing section for periodically performing averaging processing on image data of an averaging target, the averaging processing comprising calculating an average value of pixel values of pixels which correspond to a position of a one-dimensional or two-dimensional averaging pattern designating averaging target pixels and replacing each of the pixel values of the pixels which correspond to the position of the one-dimensional or two-dimensional averaging pattern with the average value; and
a screen processing section for, using a screen pattern, periodically performing screen processing on the image data on which the averaging processing has been performed, a periodicity of the screen processing being the same as that of the averaging processing;
wherein when an image discriminating signal showing a property of each pixel of the image data is input, the averaging processing section excludes pixels belonging to a specific region among target pixels in the one-dimensional or two-dimensional averaging pattern from the target pixels of the averaging processing and calculates the average value of pixel values of pixels not belonging to the specific region in the one-dimensional or two-dimensional averaging pattern, based on the image discriminating signal.

2. The image processing apparatus of claim 1, wherein shapes of the one-dimensional or two-dimensional averaging pattern and the screen pattern are modifiable.

3. The image processing apparatus of claim 1, wherein shapes of the one-dimensional or two-dimensional averaging pattern and the screen pattern vary with each color material used for an output of the image data.

4. The image processing apparatus of claim 1, wherein periods of the one-dimensional or two-dimensional averaging pattern and the screen pattern are modifiable.

5. The image processing apparatus of claim 1, wherein periods of the averaging processing and the screen processing vary with each color material used for an output of the image data.

6. The image processing apparatus of claim 1, wherein the one-dimensional or two-dimensional averaging pattern is a pattern in which the same weighting coefficient is set for all averaging target pixels.

7. The image processing apparatus of claim 6, wherein the averaging processing section calculates an average value which averages uniformly pixel values of pixels which correspond to a position of the one-dimensional or two-dimensional averaging pattern, based on a weighting coefficient which has been set in the one-dimensional or two-dimensional averaging pattern, and replaces the pixel values of the pixels which correspond to the position of the one-dimensional or two-dimensional averaging pattern with the calculated average value.

8. An image processing apparatus, comprising:
   an averaging processing section for periodically performing averaging processing on image data of an averaging target, the averaging processing comprising calculating an average value of pixel values of pixels which correspond to a position of a one-dimensional or two-dimensional averaging pattern designating averaging target pixels and replacing each of the pixel values of the pixels which correspond to the position of the one-dimensional or two-dimensional averaging pattern with the average value; and
   a screen processing section for, using a screen pattern, periodically performing screen processing on the image data on which the averaging processing has been performed, a periodicity of the screen processing being the same as that of the averaging processing;
   wherein the one-dimensional or two-dimensional averaging pattern is a pattern in which different weighting coefficients have been set for different averaging target pixels.

9. The image processing apparatus of claim 8, wherein the averaging processing section calculates a multiplication value which is obtained by multiplying each respective pixel value of each pixel which corresponds to a position of the one-dimensional or two-dimensional averaging pattern by a corresponding one of the weighting coefficients, and replaces each respective pixel value with an average value which is obtained by dividing a sum of each multiplication value by a sum of all weighting coefficients.

10. The image processing apparatus of claim 1, wherein the screen processing section performs the screen processing at a random period; and the averaging processing section performs the averaging processing at the random period of the screen processing.

11. The image processing apparatus of claim 1, wherein the averaging processing section performs the averaging processing at a fixed period; and the screen processing section performs the screen processing at the fixed period of the averaging processing.

12. The image processing apparatus of claim 1, wherein the screen pattern has the same shape as the one-dimensional or two-dimensional averaging pattern.

13. An image processing method, comprising: one or more processors Implementing,
   periodically performing averaging processing on image data of an averaging target, the averaging processing comprising calculating an average value of pixel values of pixels which correspond to a position of a one-dimensional or two-dimensional averaging pattern designating averaging target pixels and replacing each of the pixel values of the pixels which correspond to the position of the one-dimensional or two-dimensional averaging pattern with the average value; and
   periodically performing screen processing, using a screen pattern, on the image data on which the averaging processing has been performed, a periodicity of the screen processing being the same as that of the averaging processing;
   wherein when an image discriminating signal showing a property of each pixel of the image data is input, the averaging processing excludes pixels belonging to a specific region among target pixels in the one-dimensional or two-dimensional averaging pattern from the target pixels of the averaging processing and calculates an average value of pixel values of pixels not belonging to the specific region in the one-dimensional or two-dimensional average pattern, based on the image discriminating signal.

14. The image processing method of claim 13, wherein shapes of the one-dimensional or two-dimensional averaging pattern and the screen pattern are modifiable.

15. The image processing method of claim 13, wherein shapes of the one-dimensional or two-dimensional averaging pattern and the screen pattern vary with each color material used for an output of an image data.

16. The image processing method of claim 13, wherein periods of the one-dimensional or two-dimensional averaging pattern and the screen pattern are modifiable.

17. The image processing method of claim 13, wherein periods of the averaging processing and the screen processing vary with each color material used for an output of the image data.

18. The image processing method of claim 13, wherein the one-dimensional or two-dimensional averaging pattern is a pattern in which the same weighting coefficient is set for all averaging target pixels.

19. The image processing method of claim 18, wherein performing averaging processing comprises calculating an average value which averages uniformly pixel values of pixels which correspond to a position of the one-dimensional or two-dimensional averaging pattern, based on a weighting coefficient which has been set in the one-dimensional or two-dimensional averaging pattern, and replacing the pixel values of the pixels which correspond to the position of the one-dimensional or two-dimensional averaging pattern with the calculated average value.

20. An image processing method, comprising: one or more processors Implementing,
   periodically performing averaging processing on image data of an averaging target, the averaging processing comprising calculating an average value of pixel values of pixels which correspond to a position of a one-dimensional or two-dimensional averaging pattern designating averaging target pixels and replacing each of the pixel values of the pixels which correspond to the position of the one-dimensional or two-dimensional averaging pattern with the average value; and periodically performing screen processing, using a screen pattern, on the image data on which the averaging processing has been performed, a periodicity of the screen processing begin the same as that of the averaging processing;

wherein the one-dimensional or two-dimensional averaging pattern is a pattern in which different weighting coefficients have been set for different averaging target pixels.

21. The image processing method of claim 20, wherein performing averaging processing comprises calculating a multiplication value which is obtained by multiplying each respective pixel value of each pixel which corresponds to a position of the one-dimensional or two-dimensional averaging pattern by a corresponding one of the weighting coefficients, and replacing each respective pixel value with an average value which is obtained by dividing a sum of each multiplication value by a sum of all weighting coefficients.

22. The image processing method of claim 13, wherein performing screen processing comprises performing the screen processing at a random period; and performing averaging processing comprises performing the averaging processing at the random period of the screen processing.

23. The image processing method of claim 13, wherein performing averaging processing step comprises performing the averaging processing at a fixed period; and performing screen processing comprises performing the screen processing at the fixed period of the averaging processing.

24. The image processing method of claim 13, wherein the screen pattern has the same shape as the one-dimensional or two-dimensional averaging pattern.

* * * * *